United States Patent [19]

North

[11] Patent Number: 4,712,439
[45] Date of Patent: Dec. 15, 1987

[54] APPARATUS FOR PRODUCING A FORCE

[76] Inventor: Henry North, R.R. #16, Thunder Bay, Ontario, Canada, P7B 5E5

[21] Appl. No.: 832,235

[22] Filed: Feb. 24, 1986

[51] Int. Cl.$^4$ .............................................. F16H 33/02
[52] U.S. Cl. ...................................... 74/84 R; 74/84 S; 74/61
[58] Field of Search ............... 180/7.1; 248/636, 638; 74/84 S, 61, 84 R, 87

[56] References Cited

U.S. PATENT DOCUMENTS

| | | | |
|---|---|---|---|
| 3,012,654 | 12/1961 | Allen et al. | 74/61 |
| 3,215,209 | 11/1965 | DesVaux et al. | 74/61 |
| 3,584,515 | 6/1971 | Matyas | 74/84 S |
| 3,807,244 | 4/1974 | Estrade | 74/84 S |
| 3,968,700 | 7/1976 | Cuff | 74/84 S |
| 3,998,107 | 12/1976 | Cuff | 74/84 S |
| 4,095,460 | 6/1978 | Cuff | 74/84 S |
| 4,241,615 | 12/1980 | Ryan | 74/87 |
| 4,408,740 | 10/1983 | Kleber | 248/638 |
| 4,570,616 | 2/1986 | Kunz et al. | 74/61 |
| 4,579,011 | 4/1986 | Dobos | 74/84 R |
| 4,631,971 | 12/1986 | Thornson | 74/84 S |

FOREIGN PATENT DOCUMENTS 0128008 12/1984 European Pat. Off. .
933483 1/1948 France .................. 74/84 S Primary Examiner—Cornelius J. Husar
Assistant Examiner—Peter M. Cuomo
Attorney, Agent, or Firm—Adrian D. Battison

[57] ABSTRACT

Apparatus for producing a propulsion force comprises a pair of counter-rotating externally geared flywheels which are mounted on shafts for rotation in a housing and are balanced for high speed rotation. Each flywheel carries a mass slideable thereon in a radial slot but constrained to rotate angularly with the flywheel. The mass is constrained to rotate eccentrically of the flywheel by a stationary cam surface surrounding the path of rotation of the mass. The cam surface is provided on a plate slideable relative to the flywheels to adjust the degree of eccentricity of the cam track relative to the flywheel. A vibration isolation unit is connected between the housing of the flywheels and the frame of the device including a pair of airbags positioned between plates so as to communicate only the net unidirectional force from the housing to the chassis.

15 Claims, 6 Drawing Figures

APPARATUS FOR PRODUCING A FORCE

BACKGROUND OF THE INVENTION

This invention relates to apparatus for producing a propulsion force.

Various prior proposals have been made for apparatus which produces a propulsion force from masses which are rotated eccentrically. Examples are shown in U.S. Pat. Nos. 3,998,107 and 4,095,460 of Cuff. Further examples are shown in U.S. Pat. Nos. 3,584,515 Matyas and 3,807,244 Estrade. However these devices have severe limitations on the rotation speed of the masses which can be obtained either in view of high centrifugal forces which are applied to a central shaft or various other limitations for example fluid flow limitations or other force limitations due to high centrifugal forces which are generated by rotating bodies.

A further example is raised by Cuff in his U.S. Pat. No. 3,968,700 which shows a rotatable body carrying masses which can move radially but are confined by a track. This device however lacks vibration isolation, uses multiple cylindrical arms which is complex and therefore expensive. It also generates a high unbalanced load on the main mounting shaft which cannot be balanced out dynamically. This limits the rotational speed and prevents the production of a useable net force.

A further example is shown in European Patent Application No. 128,008 (Thornson) which rotates two bodies each carrying an eccentric mass. In the latter case, however, the eccentric forces are communicated to bearings and thus severely limit the speed of rotation which can be achieved.

For these reasons very limited success has been obtained by devices of this type although the principal can be demonstrated to be effective.

SUMMARY OF THE INVENTION

It is one object of the present invention, therefore, to provide an improved design of a device of this type which enables high speed rotation and accordingly significantly increased forces which can achieve practically useable level.

According to the invention, therefore, there is provided apparatus for producing a motor force comprising a housing, a first and a second balanced flywheel, bearing means mounting said flywheels for rotation in the housing about respective parallel axis, drive means for drivingly rotating said flywheels in opposed directions about said axis, a first and second mass, each flywheel including means for applying force to a respective one of the masses in a direction angularly of the respective axis such that the mass rotates therewith, each mass being free to move relative to the respective flywheel in a direction radially of the flywheel to define a rotating path of the mass around the axis of the respective flywheel, a first and second guide track means fixed relative to the housing and each providing a smooth surface fully surrounding the rotating path of a respective one of the masses so as to confine the motion of the mass at all points around its periphery, one of the cam tracks being a mirror image of the other and each having a portion on one side of the axis which is spaced upon the axis by a distance greater than a portion diametrically opposite thereto, whereby the masses generate on said housing through said track means a net proportion force towards said one side while applying to said flywheels in directions radial thereto substantially zero net force.

The flywheels thus are balanced without any radial forces being applied to a mounting shaft of the flywheels so they can rotate at high velocity for subcentrifugal forces generated by the eccentric masses are communicated to a rigid and structurally confined cam track on the housing. Thus preferably the flywheels can be driven at constant rate and a variation in the unidirectional force obtained by adjusting the position of the cam track relative to the axis of the flywheel.

In accordance with a further important preferred feature, the housing is carried relative to a frame by a vibration isolation system which allows the communication of the unidirectional force while preventing transmission of vibration of the housing to the frame. Such a vibration isolation device can effectively be provided by an airbag assembly in which the housing is mounted upon a central plate separated from two outer plates by airbags with the vibration of the housing being confined to a direction transverse to the plates.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
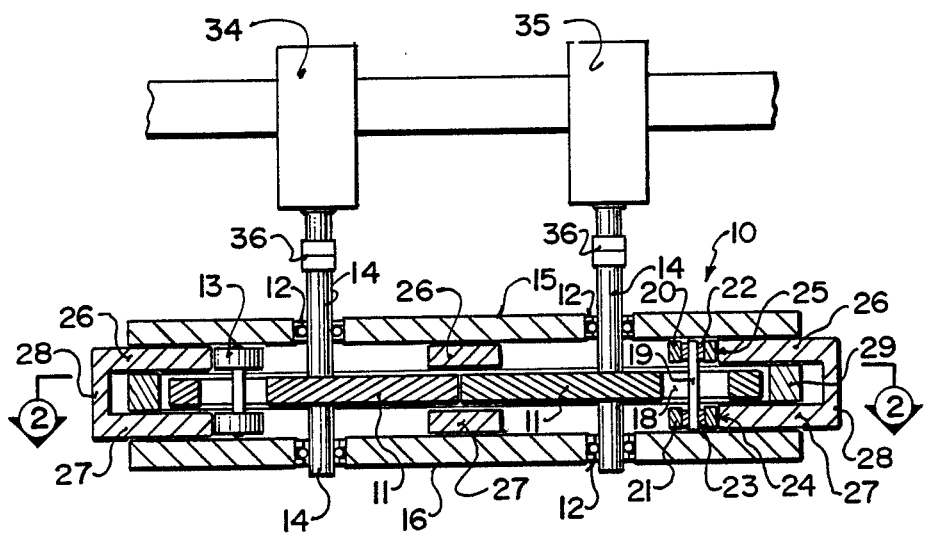
FIG. 1 is a cross-sectional view of an apparatus for producing a propulsion force according to the invention.
Figure 2:
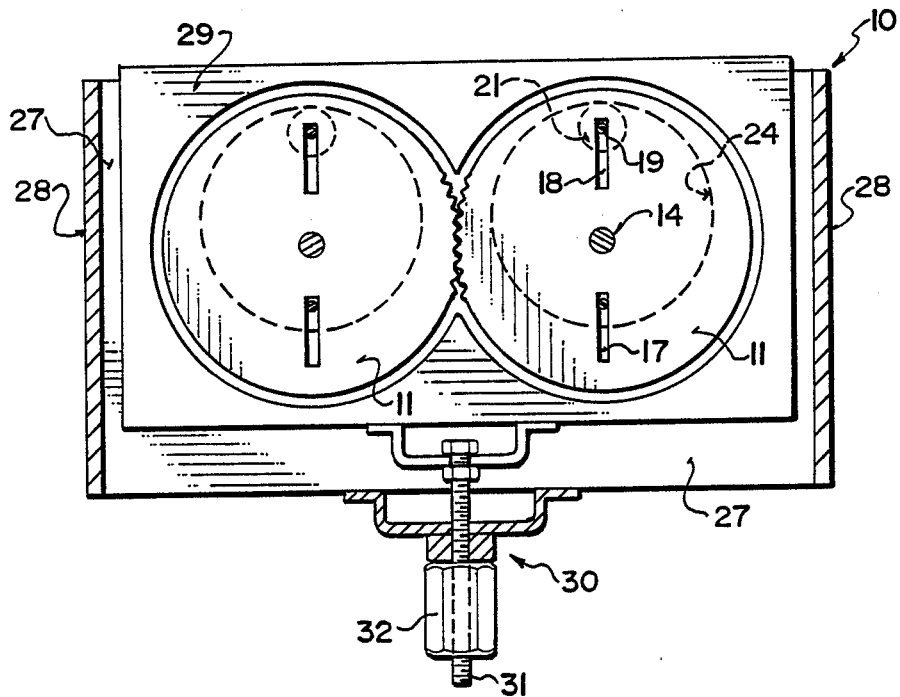
FIG. 2 is a cross-sectional view along the lines 2—2 of FIG. 1.

Turning firstly to FIGS. 1 and 2, the apparatus for producing a propulsion force comprises a housing generally indicated at 10 which carries a pair of flywheels 11 mounted for rotation within the housing on bearings 12. Thus the flywheels 11 are arranged to have a significant weight relative to a pair of masses 13 each of which is carried by a respective one of the flywheels.

Each flywheel 11 is carried upon a shaft 14 which is arranged axially of the flywheel and centrally thereof such that the flywheel can rotate in a balanced manner around the shaft 14. The shaft 14 is in turn mounted in a pair of bearings 12 which are spaced axially of the shaft and are carried respectively in a front face 15 and rear face 16 of the housing 10.

Each flywheel 11 has a pair of slots 17, 18 at diametrically opposed positions. One of these slots 18 is arranged to receive a pin or shaft 19 of the mass 13 which extends transverse to the slot so as to have respective ends on opposed sides of the flywheel. The pin has a width substantially equal to that of the slot so that it can slide longitudinally in the slot but is prevented from side to side movement. The slot 18 as shown best in FIG. 2 extends radially of the flywheel from a position adjacent the periphery to a position closer to the shaft 14 to allow the pin 19 to move in that radial direction.

Opposed ends of the pin 19 carry annular mass members or bodies 20, 21 which are mounted relative to the pin 19 on bearings 22, 23 so that the mass members rotate around the pin while the pin remains effectively stationary relative to the slot 18.

The mass members or bodies 20 and 21 are rotated and confined to move around the shaft 14 by rolling on a pair of spaced cam surfaces or guide tracks 24, 25. Thus the guide tracks 24, 25 are spaced axially of the shaft 14 so that one cooperates with the upper mass member 20 while the other cooperates with the lower mass member 21 in the orientation shown in FIG. 1. The mass members 20 and 21 are rotated around the pins 19 and hence are symmetrically balanced in their rotation and act as gyroscopes in view of their rotation about the axis of the pin.

Each of the guide tracks 24, 25 is circular in shape and is defined in a plate 26, 27 which is shown in cross-section in FIG. 1 and part of one of which is visible in FIG. 2. The plates 26, 27 are linked so as effectively to form a single body by an edge flange 28 which is shown schematically for convenience.

It would be appreciated, therefore, that the housing 10 comprises the upper and lower walls 15 and 16 together with a surrounding upstanding wall portion indicated at 29. Furthermore the housing includes the plates 26, 27 which are separated from the remainder of the housing and thus are moveable relative thereto. For this purpose an adjustment device schematically indicated at 30 comprises a bolt 31 having a head attached to the central portion 29 of the housing and a rotatable nut 32 moveable along the bolt 31 and attached to the plate 27. The nut 32 includes a suitable drive mechanism so that power can be applied to the nut 32 to provide powered adjustment of the position of the plates 26, 27 relative to the remainder of the housing. It will be appreciated that the adjustment direction lies along a line joining the axis of the shaft 14 and the direction of eccentricity of the cam tracks 24, 25. In this way the degree of eccentricity of the guide tracks can be adjusted from zero to a maximum position on the one side as shown in FIG. 2 to a maximum position on the opposed side which is not shown.

Variation in the eccentricity can also be achieved by moving the intermediate track plate relative to the housing in which case the screw crank is fixed to the housing.

The additional slot 17 is a dummy slot but is provided to enable balancing of the flywheel 11 so that it can rotate around the shaft 14 without any centrifugal forces on the shaft 14. This enables high speed rotation of the flywheel and also the generation of significant inertia in the flywheel to maintain a constant velocity of the flywheel.

Figure 3:
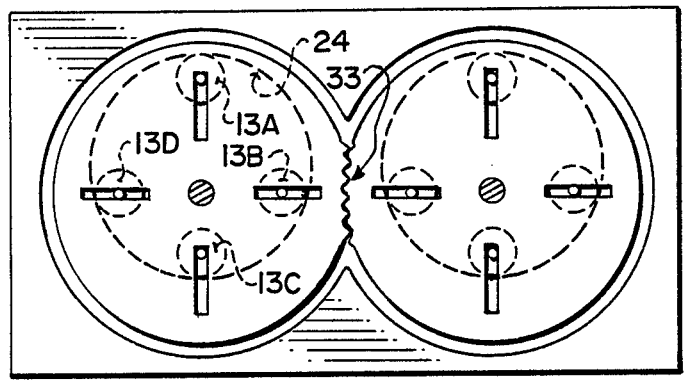
FIG. 3 is a further cross-sectional view similar to that of FIG. 2 showing the mass of each flywheel in a number of different positions.

In the position of the guide track plates 26, 27 shown in FIG. 3, it will be appreciated from the various positions of the mass 13 illustrated at 13a, 13b, 13c and 13d that the mass is confined to move by the guide track 24 such that it is at a maximum radial distance from the shaft 14 at the position 13a, a minimum distance at the position 13c and of course intermediate distances at the positions 13b and 13d.

It will also be appreciated that the flywheels constitute an exact mirror image of one another and are rotated in opposed directions and for this purpose they include a peripheral set of gear teeth indicated at 33 by which they can co-rotate at an exactly common speed. The flywheels can be driven by a single motor coupled to one of the shafts 14 or as shown in FIG. 1 by a pair of motors 34, 35 which are coupled to respective ones of the shafts 14 through flexible couplings 36. This arrangement provides an exactly similar system so that the gyroscopic effects generated by rotation of a body are counterbalanced by similar gyroscopic effect in the opposite direction.

While the exact mechanism for the generation of forces cannot at this time be fully calculated or measured, it can be shown experimentally that the unbalanced centrifugal forces, provided by the eccentric rotation of the masses as confined by the cam surfaces, provide a net unidirectional force along a line joining the center of the circular cam track and the shaft 14. Thus in FIG. 2 a net force is generated in an upward direction and that force can be controlled by, as explained previously, varying the eccentricity from the maximum upward force as shown through a zero force to a maximum downward force.

Figure 4:
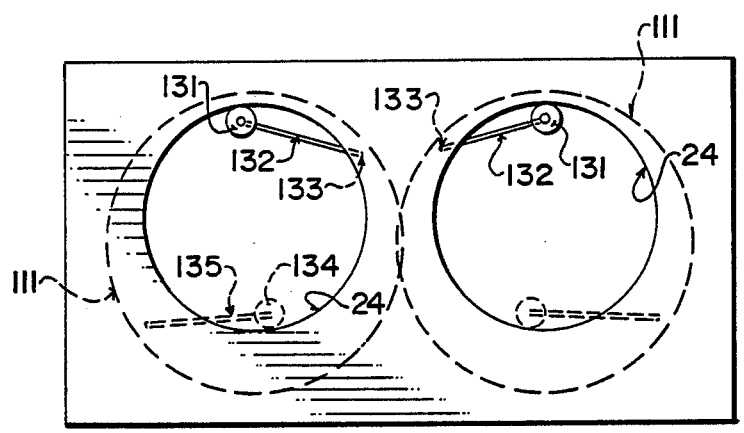
FIG. 4 is a cross-sectional view similar to FIG. 2 showing a modified mounting of the masses on the flywheels.

Turning now to FIG. 4, the flywheels are indicated at 111 and are basically of the construction shown in FIG. 1 except that the slots are omitted. In this embodiment, the masses 131 are carried by the flywheels on trailing links 132 which are rotationally coupled to the respective mass 131 at one end and are pivotally coupled to the respective flywheel at a forward end indicated at 133. The pivotal coupling 133 (shown only schematically) enables the mass to move radially relative to the respective flywheel substantially without the application of radial force to the flywheel. Thus the flywheel applies an angular force to the mass with the unbalanced centrifugal forces, as explained previously, applied by the mass to the cam track 24. A second position of the mass and trailing link is shown in dotted line at 134, 135.

Figure 5:
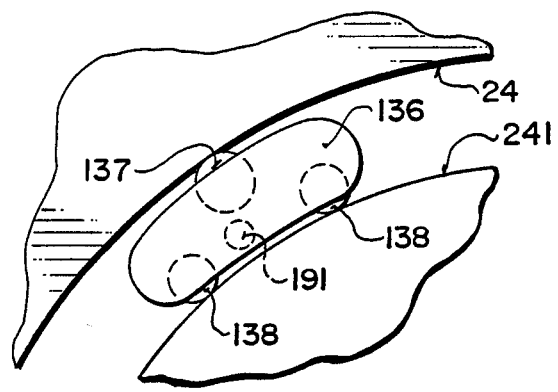
FIG. 5 is a cross-sectional view similar to FIGS. 2 and 4 showing a yet further modified arrangement.

Turning now to FIG. 5, a further modified arrangement is shown in which the flywheel is omitted for simplicity of illustration showing only the pin upon which the mass is mounted and indicated at 191. In this case the mass is indicated at 136 and carried an outer roller 137 together with a pair of inner rollers 138. The outer roller 137 cooperates with the cam track 24 while the inner rollers 138 cooperate with an inner cam track 241 which confines the inward movement of the mass to prevent it leaving the track 24.

Figure 6:
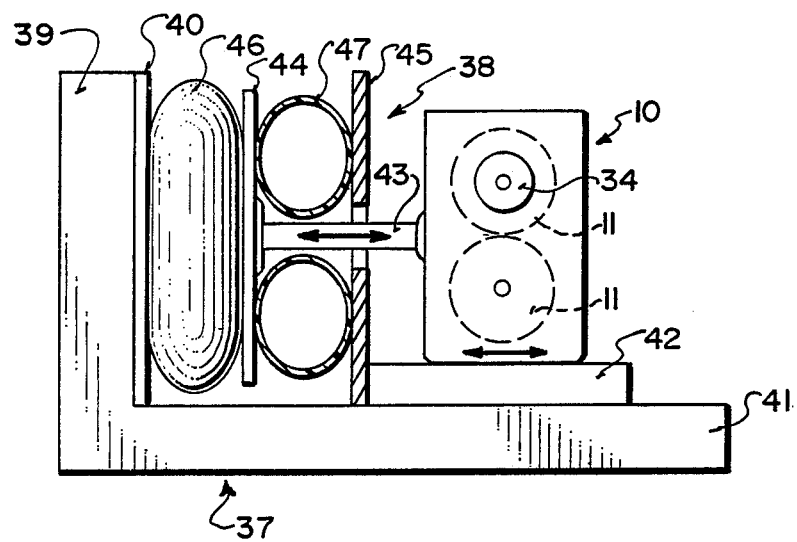
FIG. 6 is a side-elevational view showing schematically a mounting arrangement for the housing of the apparatus of FIGS. 1 and 2.

In order to communicate force from the housing 10 to a chassis or frame 37 smoothly without communicating the vibration of the housing, there is provided a vibration isolation device generally indicated at 38. In FIG. 6, therefore, the chassis 37 comprises an upright buttress 39 which carries an end plate 40 together with an elongate base member 41 which extends outwardly from the buttress toward and beneath the housing 10. The elongate base member carries a slide guide schematically indicated at 42 which supports the housing 10 in a vertical direction but allows it to freely slide relative to the base member 41 in a horizontal direction. The housing 10 is attached to a strut or shaft 43 which extends outwardly away from the housing in the direction of vibration and unidirectional force. A remote end of the strut end 43 is attached rigidly to an intermediate plate member 44 parallel to the end plate 40. A further plate member 45 between the plate 44 and the housing 10 is rigidly attached to the base member 41. Between the plates 40, 44, 45 are positioned two airbags 46, 47 at least the second of which is annular in shape to allow the strut 43 to pass therethrough. Similarly the plate 45 includes a central opening. The airbags are chosen to be of a size and flexibility such that they dampen or isolate vibration from the housing and avoid communicating that vibration to the frame 37. However any unidirectional force either in the leftward direction or in the rightward direction as viewed in FIG. 6 is communicated through the airbags from the plate 44 to the chassis to provide unidirectional force on the chassis.

In practice the flywheels can rotate at a speed of at least 3000 rpm. and possibly up to 20,000 rpm. In such a case the airbags are tuned to isolate vibrations of that frequency since the flywheels are generally intended to rotate at constant velocity.

The maximum eccentricity is of the order of 20% to 30%, the latter value being at which the mass begins to leave the track. In one example an eccentricity of 0.3 inches developed an oscillation of 0.04 inches amplitude.

Current calculations based upon a rotational speed of 4,200 rpm. or 70 hz. provide a theoretical net force of 120 newtons or 27 pounds force with a wave having a frequency of 70 hz. at a force amplitude of 15 newtons.

Doubt is expressed scientifically that a force can be generated in this manner without a corresponding reaction force but it is now believed that a reaction upon a rotating mass is possible within a counterrotating gyroscopic system in space.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for producing a force comprising a housing, a first and a second balanced flywheel, bearing means mounting each of said flywheels for rotation in the housing about one of a pair of spaced parallel axes, drive means for drivingly rotating each of said flywheels in opposed directions about its respective axis, a first and second mass, each flywheel including means for applying force to a respective one of the masses in a direction angularly of the respective axis such that the mass rotates therewith about the respective axis, each mass being free to move relative to the respective flywheel in a direction radially of the flywheel to define a rotating path of the mass around the axis of the respective flywheel, a first and second guide track means, means mounting said guide track means on said housing so as to be stationary relative thereto and so as to transmit forces from the guide track means to the housing, each guide track means providing an inwardly facing surface fully surrounding the rotating path of a respective one of the masses, each of said masses consisting of a shaft member having an axis parallel to the axis of the respective flywheel and spaced radially thereof, a body surrounding the shaft and symmetrically balanced around the axis of the shaft and bearing means mounting the body on the shaft to concentric balanced rotation therearound, said body having an outwardly facing peripheral surface for rolling on a respective one of said guide track means such that said rolling thereon causes rotation of the body about the shaft axis each said rotating body constituting a gyroscope, one of the guide track means being a mirror image of the other and each having a portion on one side of the axis of the respective flywheel which is spaced from the axis by a distance greater than a portion diametrically opposite thereto.

2. The invention according to claim 1 wherein the guide track means are circular and are eccentrically offset to one side of the respective axis.

3. The invention according to claim 1 wherein the guide track means are mounted on a guide track member which is moveable in a direction transverse to a line joining the axes of said flywheels whereby to vary the difference in distance between said portion on one side and said diametrically opposite portion.

4. The invention according to claim 1 wherein said drive means is arranged to drive said flywheels at a substantially constant angular velocity and wherein the guide track means are mounted on a guide track member which is moveable in a direction transverse to a line joining the axes of said flywheels whereby to vary the difference in distance between said portion on one side and said diametrically opposite portion.

5. The invention according to claim 1 wherein each of said flywheels includes a slot therethrough which is elongated in a radial direction of the respective flywheel, said shaft of said respective mass being freely slideable in said slot whereby to confine movement of said mass relative to said flywheel in a radial direction.

6. The invention according to claim 5 wherein said mass comprises a first portion on one side of said flywheel and a second portion on an opposed side of said flywheel each of said mass portions being arranged to cooperate with a respective one of a pair of guide track means.

7. The invention according to claim 6 wherein each of said means portions is rotatable relative to said shaft on bearing means.

8. The invention according to claim 6 wherein each of said flywheels is mounted upon a shaft arranged axially of the respective flywheel, said bearing means including a first bearing on one end of said shaft and a second bearing at an opposed end of said shaft both of said bearings being mounted in said housing.

9. The invention according to claim 8 wherein said guide track means, flywheels and masses are mounted within a chamber defined within the housing and closed at respective ends by said first and second bearings.

10. The invention according to claim 1 wherein each of said flywheels includes a peripheral surface carrying gear teeth spaced angularly and axially directed and arranged such that the gear teeth of one of said flywheels intermesh with the gear teeth of the other of said flywheels so that said flywheels are rotated at the same velocity in opposed directions.

11. The invention according to claim 8 including means for driving a shaft of one of said flywheels whereby to drive both of said flywheels in said opposed directions.

12. The invention according to claim 1 wherein said drive means comprises a drive motor and flexible coupling means whereby vibration of said flywheels and housing is isolated from said drive motor.

13. The invention according to claim 1 including a frame, means mounting said housing in said frame for reciprocating movement relative thereto in a direction longitudinal of a line joining a respective one of the axes to said portion on one side of a respective one of the guide track means, and means for isolating vibration of said housing from said frame while communicating to said frame a unidirectional force from said housing.

14. The invention according to claim 13 wherein said vibration isolation means comprises a shaft, means mounting said housing on said shaft for vibrational movement longitudinal of the shaft, a plate member transverse to the shaft, a first and a second further plate members parallel to the plate member and receiving therebetween air bag means for isolating vibrational movement of said plate member relative to said further plate members, one of said further plate members having an opening therein through which said shaft projects.

15. The invention according to claim 1 wherein each of said masses is mounted on a respective one of the flywheels by a trailing link member having one end attached to said mass and an opposed end attached to the flywheel at a position adjacent the periphery thereof and arranged forwardly of the respective mass whereby the mass can pivot relative to the flywheel radially inwardly therefrom about said forward end of said link member.

* * * * *